May 12, 1970     H. M. ECKERLIN     3,511,094

FLUID OPERATED TEMPERATURE SENSING ELEMENT

Filed May 17, 1968

INVENTOR.
Herbert M. Eckerlin
BY Walter S. Zabrowski
ATTORNEY

United States Patent Office 3,511,094
Patented May 12, 1970

3,511,094
FLUID OPERATED TEMPERATURE SENSING ELEMENT
Herbert M. Eckerlin, Raleigh, N.C., assignor to Corning Glass Works, Corning, N.Y., a corporation of New York
Filed May 17, 1968, Ser. No. 730,009
Int. Cl. G01k 5/62
U.S. Cl. 73—363.3           9 Claims

ABSTRACT OF THE DISCLOSURE

A cylindrically shaped housing constructed of a material having a low coefficient of thermal expansion attached to a nozzle from which a fluid stream is emitted to flow along the interior of the housing and impinge upon the end surface of a member constructed of a material having a high coefficient of thermal expansion. The differential thermal expansion between the housing and the member produces changes in the distance separating the nozzle and the end surface of the member which corresponds to temperature changes in the medium being sensed. Changes in the separation distance produce corresponding changes in fluid back-pressure within the nozzle which can be detected and amplified by conventional fluidic devices in order to determine the temperature.

BACKGROUND OF THE INVENTION

Various forms of temperature-to-fluid pressure transducers or sensing elements using associated electrical or electronic circuitry to accomplish their function are well known in the prior art. One usual class of such elements utilizes the well known physical principle that a gas driven resonance chamber can produce a sonic vibration whose fundamental frequency is proportional to the square root of the absolute temperature of the gas. Such elements employ a pressure-to-electrical transducer such as a vibrating metallic diaphragm, crystal, or other form of microphone to make the conversion of the gas pressure signal to an electrical signal. The frequency of the converted electrical signal is detected in order to determine the gas temperature. Often, however, it is necessary to amplify the electrical signal in a suitable amplifier system in order to obtain a signal of sufficient strength to permit its frequency to be detected with conventional electronic instruments.

One of the problems encountered in the use of microphones to convert mechanical vibrations to electrical impulses is the relatively low temperature range to which such devices are limited. Another problem encountered is that the response of the resonance chamber is not always linear over a wide range of gas temperatures. Because of the electrical circuitry associated with such prior art transducers the system is often bulky, difficult to calibrate, difficult to maintain in a calibrated state, and expensive to obtain.

SUMMARY OF THE INVENTION

It is therefore an object of the instant invention to provide a fluid operated temperature sensing element which produces fluid pressure variations corresponding to temperature variations.

It is a further object of the instant invention to provide a fluid operated temperature sensing element whose fluid output signal can be measured directly with conventional fluid detecting devices without the need for electrical signal conversion.

It is still another object of the instant invention to provide a fluid operated temperature sensing element capable of operating over a wider range of temperatures than possible.

It is yet another object of the instant invention to eliminate the need for electronic amplifier circuitry in a fluid operated temperature sensing element.

Briefly, in accordance with the instant invention, a fluid operated temperature sensing element is provided having a nozzle for issuing a stream of fluid. A surface means is disposed in the path of the stream in order to produce fluid back-pressure in the nozzle which corresponds to the distance separating the nozzle and surface upon which the stream impinges. The distance separating the nozzle and surface means changes in response to a temperature change thereby changing the fluid back-pressure in the nozzle correspondingly.

Additional objects, features, and advantages of the instant invention will become apparent to those skilled in the art from the following detailed description and attached drawings on which, by way of example, only the preferred embodiments of the instant invention are illustrated.

DETAILED DESCRIPTION OF THE PREFERRED EMBODIMENTS

Figures 1, 2, 3, 4, 5:
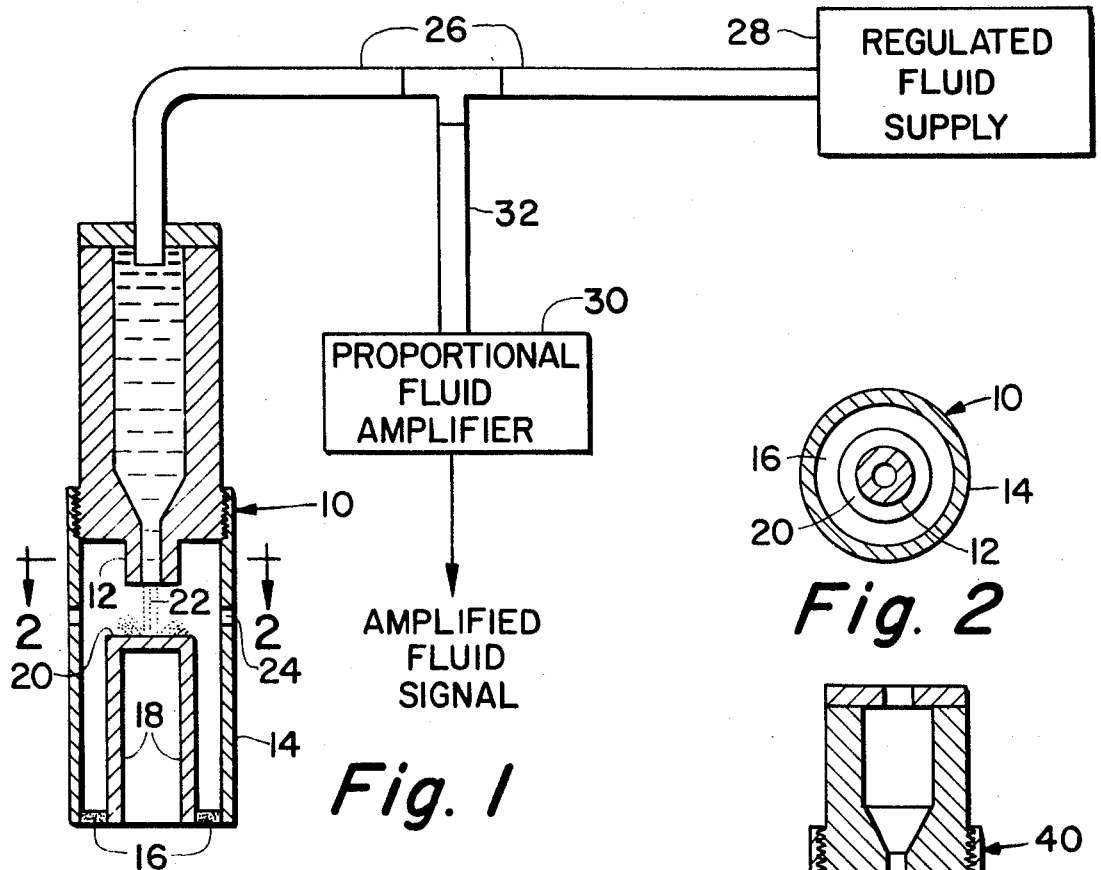
FIG. 1 shows a cross-sectional elevation of a fluid driven temperature sensing element illustrating one embodiment of the instant invention.
FIG. 2 shows a cross-secitonal view of the fluid driven temperature sensing element shown in FIG. 1 taken along lines 2—2 thereof.
FIG. 3 shows a cross-sectional elevation of another embodiment of the instant invention.
FIG. 4 shows a cross-sectional elevation of another embodiment of the instant invention.
FIG. 5 shows an oblique view of another embodiment of the instant invention.

Referring to FIGS. 1 and 2 there is shown a fluid driven temperature sensing element 10 having a nozzle 12 to which is adjustably affixed one end of a hollow cylindrically shaped housing 14 constructed of a high thermal expansion material such as copper, stainless steel, tungsten steel, high expansion ceramic material, or the like. Affixed to the other end of the housing 14 by expandable springs, cement, or other suitable and well known bonding materials 16 is a cylindrically shaped member 18 having a closed end or surface 20 which is positioned within the interior of the housing 14 so as to interrupt the flow of a stream 22 of fluid issuing from the nozzle 12. The member 18 is constructed of a suitable material having a different coefficient of thermal expansion than that of the material comprising the housing 14. In the instant example the member 18 is constructed of a suitable low thermal expansion material such as fused silicon, low expansion ceramic material, Invar (an alloy of steel containing about 36% nickel), or the like. Vent holes 24 through the side of the housing 14 permit the fluid to exhaust from the element 10 after it has been scattered off the surface 20. Because the housing 14 is, as illustrated, affixed to the nozzle 12 by means of threading, the gap distance may be adjusted as desired by turning the housing 14. This permits the element 10 to be calibrated for different ambient conditions under which it may be used. Also, the sensitivity and range of temperature sensitivity can be selected in this manner.

The element 10 is driven with a fluid such as air oxygen, nitrogen, or the like, under pressure, through a suitable fluid supply line 26 from a regulated or otherwise constant pressure fluid supply 28. A conventional fluid amplifier 30 is connected through a fluid line 32 to the supply line 26 in order to amplify fluid pressure variations in the nozzle 12 and line 26 to any desired level for metering, or operating conventional display instruments and process control equipment.

The housing 14 and member 18 of the element 10 are exposed to a medium whose temperature is to be measured. The differential expansion between the housing 14 and member 18 is a function of the medium temperature once a steady state condition has been reached between the medium and the element 10. Accordingly, the distance separating the nozzle 12 from the surface 20 is a function of the medium temperature. Moreover, due to fluid back-pressure in the nozzle 12 the pressure of the fluid to which the amplifier 30 responds, i.e., the pressure in the nozzle 12 and line 26, corresponds to the separation distance between the nozzle 12 and surface 20. It is to be noted that the difference in thermal expansion coefficients between the housing 14 and the member 18 enables the fluid pressure in the nozzle 12 and line 26 to correspond to the medium temperature. Therefore, the housing 14 can just as well be constructed of low expansion material with the member 18 being high expansion material.

Referring to FIG. 3 a fluid driven temperature sensing element 40 is shown having a nozzle 42 to which is connected a hollow cylindrical housing 44 inside of which is a cylindrical member 46. The housing 44 and member 46 have different coefficients of thermal expansion as previously explained and are connected together by means of a threaded cap 48 which screws onto a threaded end portion of the housing 44. The member 46 has a flanged end portion 50 which overlaps the end of the housing 44 thus fitting tightly between the cap 48 and end of the housing 44.

Referring to FIG. 4 a temperature sensing element 50 is shown having a nozzle 52 and a housing 54. The housing is suitably threaded on the interior wall of one end portion in conformity with threading on the nozzle 52 to permit the housing to screw tightly onto the nozzle 52. A cylindrically shaped member 56 is positioned within the housing 54 and rests on the bottom of an end surface 58. Separation between the nozzle 52 and the member 56 is maintained in place by a coiled spring 60 preferably having a low value of spring constant so as not to significantly affect the temperature expansion characteristics of the housing 54 and member 56. As previously explained the housing 54 and member 56 are constructed of materials having different coefficients of thermal expansion such that their differential temperature expansion rates will affect the gap between the nozzle 52 and member 56 and, as a result, the back-pressure developed in the nozzle 52.

Referring to FIG. 5 there is shown a conventional bimetallic temperature sensitive element 70 which is wound in the form of a flat spiral so that the radius of the spiral expands and contracts with temperature changes. One end of the element 70 is connected to the side of a rotatable shaft 72 on an end portion thereof. The other end of the shaft 72 is connected to a circular cam 74 along an eccentric axis of rotation thereof. The periphery 76 of the cam 74 forms a surface against which a stream 78 of fluid emitted from a nozzle 80 impinges.

As the spiraled bimetallic element 70 is exposed to a temperature change it expands or contracts accordingly, causing the shaft 72 to rotate the cam 74. The separation between the periphery 76 and the nozzle 80 corresponds to the rotational displacement of the cam 74 from an arbitrary reference position. Consequently, back-pressure developed in the nozzle 80 is a function of the temperature of the medium to which the bimetallic element 70 is exposed.

Although the instant invention has been described with respect to specific details of certain embodiments thereof it is not intended that such details be limitations upon the instant invention.

I claim:
1. A fluid operated temperature sensing element comprising
nozzle means for issuing a stream of fluid,
surface means disposed in the path of said stream for producing a fluid back pressure in said nozzle means corresponding to the distance of separation between said nozzle and surface means, and
means for changing said distance of separation in response to a change in temperature such that said back pressure varies as a function of said temperature.

2. A fluid operated temperature sensing element comprising
nozzle means for issuing a stream of fluid,
surface means disposed in the path of said stream for producing a fluid back-pressure in said nozzle means corresponding to the distance of separation between said nozzle and surface means, and
means affixed to said nozzle means for supporting said surface means, the coefficients of thermal expansion of the materials of said surface and supporting means being different so as to vary said distance of separation in response to a change in temperature whereby said back pressure varies as a function of said temperature.

3. A fluid operated temperature sensing element comprising
nozzle means for issuing a stream of fluid,
a cylindrically shaped housing affixed at one end to said nozzle means to permit said stream to flow along the longitudinal axis of said housing, said housing having at least one hole through its wall for venting said fluid,
a cylindrically shaped member having an outside diameter less than the inside diameter of said housing, said member having a closed end portion positioned within the interior of said housing in the path of said stream, the coefficients of thermal expansion of said housing and member being different, and
means for securing said member in a fixed position in relation to said housing.

4. A fluid driven temperature sensing element comprising
nozzle means for issuing a stream of fluid,
a circular cam, the periphery of which is disposed in the path of said stream, the distance separating said nozzle means and periphery corresponding to the rotational displacement of said cam,
a thermally expandable spiraled member for expanding and contracting as a function of temperature change, and
a rotatable shaft, responsively connected at one end to said member for rotating about its longitudinal axis in response to expansion or contraction of said member, the other end of said shaft connected to rotate said cam.

5. The element of claim 3 wherein said securing means comprises a circular cap having a raised peripheral portion therearound, the inside wall of said raised portion being threaded, said member having a flanged end portion for overlapping the other end of said housing, the length of said member being less than the length of said housing, said other end of said housing being threaded around an outside end portion thereof in conformity with the threading of said cap, said cap being adapted to screw onto said other end of said housing, said flanged end portion fitting between said other end of said housing and cap.

6. The element of claim 3 wherein said securing means comprises a spring disposed between said closed end portion of said member and nozzle means for maintaining separation therebetween, the length of said member being less than that of said housing, the other end of said housing containing an end plate for supporting the other end of said member in the interior of said housing.

7. The element of claim 2 wherein said supporting means is adjustably affixed to said nozzle means.

8. The element of claim 3 wherein said housing is adjustably affixed to said nozzle means.

9. The element of claim 3 wherein said housing is threaded on an interior end portion thereof, said nozzle means being threaded in confromity therewith on a surface portion thereof to permit said housing to affix to said nozzle means in an adjustable manner, whereby the distance of separation between said closed end portion and the orifice of said nozzle means is variable as desired.

References Cited

UNITED STATES PATENTS 3,344,657   10/1967   Coes _____ 73—37.6

S. CLEMENT SWISHER, Primary Examiner

W. A. HENRY II, Assistant Examiner

U.S. Cl. X.R.

73—37.6